United States Patent
Rupin et al.

(10) Patent No.: US 12,189,856 B2
(45) Date of Patent: Jan. 7, 2025

(54) DEVICE FOR CREATING HAPTIC SENSATIONS ON A SURFACE USING ULTRASONIC WAVES PRODUCING ELLIPTICAL MOVEMENTS

(71) Applicants: HAP2U, Saint Martin d'Hères (FR); UNIVERSITÉ DE LILLE, Lille (FR)

(72) Inventors: Matthieu Rupin, Saint Martin d'Hères (FR); Pierre Garcia, Saint Martin d'Hères (FR); Frederic Giraud, Lille (FR); Christophe Giraud-Audine, Lille (FR); Betty Semail, Lille (FR); Michel Amberg, Lille (FR)

(73) Assignees: VIBRA NOVA, Saint-Paul-de-Varces (FR); UNIVERSITÉ DE LILLE, Lille (FR)

( * ) Notice: Subject to any disclaimer, the term of this patent is extended or adjusted under 35 U.S.C. 154(b) by 0 days.

(21) Appl. No.: 17/795,754

(22) PCT Filed: Jan. 29, 2021

(86) PCT No.: PCT/FR2021/000006
§ 371 (c)(1),
(2) Date: Jul. 27, 2022

(87) PCT Pub. No.: WO2021/152227
PCT Pub. Date: Aug. 5, 2021

(65) Prior Publication Data
US 2023/0075405 A1     Mar. 9, 2023

(30) Foreign Application Priority Data
Jan. 30, 2020 (FR) .................................. 2000932

(51) Int. Cl.
   *G06F 3/01*       (2006.01)
   *G06F 3/041*     (2006.01)

(52) U.S. Cl.
   CPC .............. *G06F 3/016* (2013.01); *G06F 3/041* (2013.01); *G06F 2203/04105* (2013.01)

(58) Field of Classification Search
   CPC . G06F 3/016; G06F 3/041; G06F 2203/04105
   See application file for complete search history.

(56) References Cited

U.S. PATENT DOCUMENTS

| | | | |
|---|---|---|---|
| 2011/0267294 A1* | 11/2011 | Kildal | G06F 3/016 345/173 |
| 2012/0229401 A1* | 9/2012 | Birnbaum | G06F 3/016 345/173 |

(Continued)

FOREIGN PATENT DOCUMENTS

| | | |
|---|---|---|
| EP | 1956466 A1 | 8/2008 |
| FR | 3068840 A1 | 1/2019 |
| WO | 2019094440 A1 | 5/2019 |

OTHER PUBLICATIONS

International Search Report (PCT/ISA/210) with translation and Written Opinion (PCT/ISA/237) mailed on Apr. 7, 2021, by the European Patent Office as the International Searching Authority for International Application No. PCT/FR2021/000006.

*Primary Examiner* — David D Davis
(74) *Attorney, Agent, or Firm* — BUCHANAN, INGERSOLL & ROONEY PC

(57) ABSTRACT

The invention relates to a touch interface comprising, on the one hand, an interfacial surface able to generate a haptic-feedback effect in response to a touch of said surface by a user, and, on the other hand, at least one piezoelectric actuator configured to generate, in said interfacial surface, at least one wave of ultrasonic frequency able to endow the particles of this surface with an elliptical movement having a movement component tangential to said surface, which component is denoted ut(t), and a movement component normal to said surface, which component is denoted un(t), (Continued)

wherein said wave of ultrasonic frequency is chosen so that the amplitude Ut of the tangential component ut(t) and the amplitude Un of the normal component un(t) are substantially equal.

15 Claims, 2 Drawing Sheets

(56) References Cited

U.S. PATENT DOCUMENTS

| | | |
|---|---|---|
| 2012/0326999 A1 | 12/2012 | Colgate et al. |
| 2014/0104165 A1* | 4/2014 | Birnbaum ............... G06F 3/016 345/156 |
| 2014/0118127 A1* | 5/2014 | Levesque ................ G08B 6/00 340/407.2 |
| 2015/0123913 A1 | 5/2015 | Kerdemelidis |
| 2015/0145657 A1* | 5/2015 | Levesque ................ G06F 3/016 340/407.2 |
| 2016/0370862 A1* | 12/2016 | Colgate .................. G06F 3/016 |
| 2019/0354185 A1* | 11/2019 | Vezzoli ................... G06F 3/044 |
| 2020/0235649 A1 | 7/2020 | Hayward et al. |
| 2020/0356173 A1* | 11/2020 | Bajaj ...................... H02P 5/00 |
| 2022/0137706 A1* | 5/2022 | Giraud ................ B06B 1/0276 345/173 |

* cited by examiner

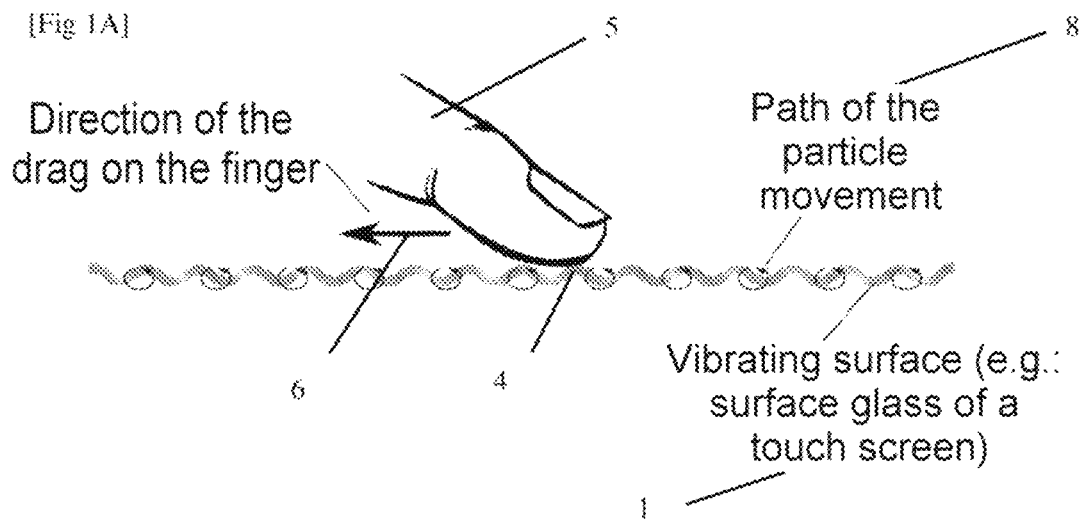
[Fig 1A]
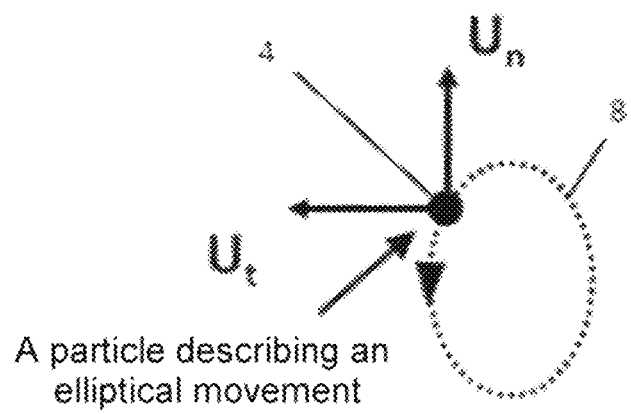
[Fig 1B]

[Fig 2]
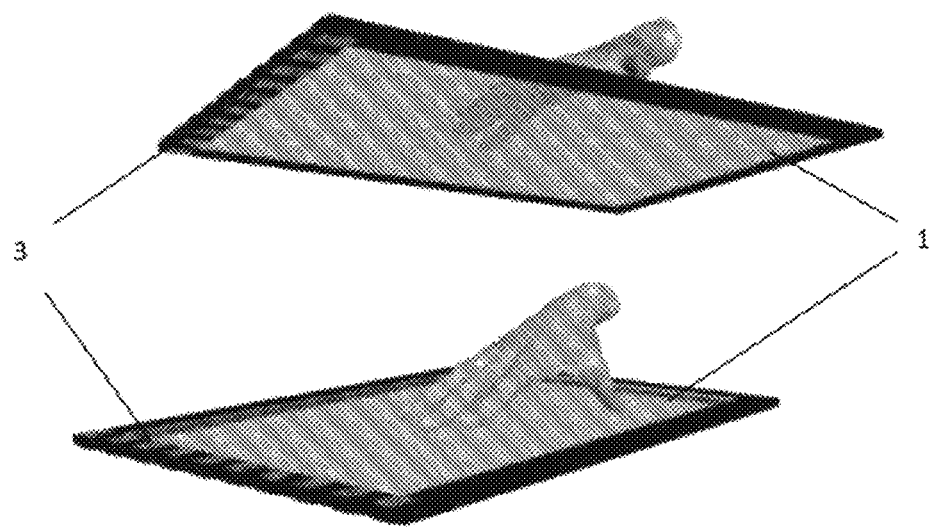
[Fig 3]
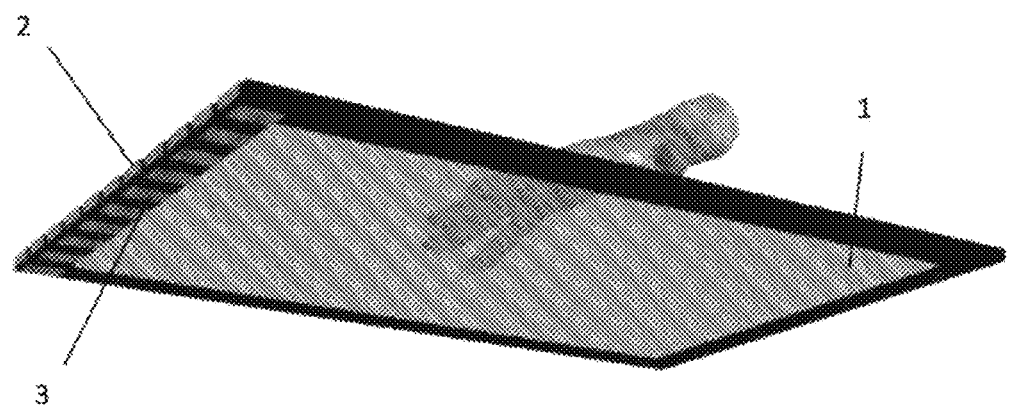

DEVICE FOR CREATING HAPTIC SENSATIONS ON A SURFACE USING ULTRASONIC WAVES PRODUCING ELLIPTICAL MOVEMENTS

FIELD OF THE INVENTION

The invention relates to surfaces capable of generating haptic feedback perceptible to a user, using elastic waves that propagate over said surfaces in the ultrasonic-frequency domain.

PRIOR ART

The number of touch interfaces able to deliver a haptic-feedback effect perceptible to a user has been growing. These touch interfaces generally use an electromechanical actuator coupled to a surface, to which they impart vibrations that are perceptible through a finger or a stylus of the user. They differ in a number of parameters, such as the frequency of the electrical signal fed to the actuators, or its amplitude.

Thus, interfaces that employ low-frequency vibro-tactile feedback and interfaces that employ haptic feedback based on the so-called squeeze-film effect are especially differentiated between.

In interfaces that employ low-frequency vibro-tactile feedback, a vibrating actuator produces a macroscopic mechanical deformation (of the order of one millimeter in magnitude) of the pulp of the finger, at the frequency of the actuator stimulus. The frequency chosen for the stimulus must lie in the range of the frequencies perceptible by touch (typically from 1 to 1000 Hz, and more often from 50 Hz to 250 Hz) and the vibrational amplitudes must be higher than the thresholds of perception of a finger at these frequencies. To generate such a vibro-tactile effect, a single actuator that has a movable portion that is made to move at the frequency of the stimulus, in a direction normal or parallel to the actuated surface, may be used. However, these actuators are in general thick, and require the movable portion to be guided by elastic parts, as described for example in document FR3068840-A1.

One example of use of vibro-tactile actuators, in particular in gamepads or equivalent applications, is described in document WO2019094440A1. The actuators used are low-frequency actuators, in particular LRAs (LRA standing for Linear Resonant Actuator) or ERM actuators (ERM standing for Eccentric Rotating Mass), which are chosen for their low cost in comparison with piezoelectric actuators, which are expressly excluded by this document for the targeted applications. Furthermore, LRAs or ERM actuators are also selected for their ability to produce locally, i.e. directly above the actuators, an elliptical force that is communicated locally to the contact surface. This elliptical movement is produced solely at the point of contact and is therefore perceptible to the user only above the actuator, directly at the point of contact. As a result, these low-frequency LRAs or ERM actuators are unsuitable for producing a traveling wave of ultrasonic frequency, capable of creating a haptic-feedback effect at various points on a haptic interface, even points distant from the actuators.

As a general rule, vibro-tactile actuators produce movements along the axis of the finger, i.e. substantially normal to the surface, that is to say out-of-plane movements, in a frequency range perceived directly via mechanoreceptors of the finger of the user.

Interfaces that employ low-frequency vibro-tactile feedback are able to deliver haptic feedback with an amplitude that will be clearly perceptible by a motionless finger placed passively on a surface. The finger may thus perceive a "click" effect, or a uniform vibration. In contrast, this type of interface is unsuitable for generating a texture effect perceptible via an active touch, such as a finger being swiped over a surface.

Furthermore, on account of the audible operating frequency used by the actuators, interfaces that employ low-frequency vibro-tactile feedback produce noise, since the movements generated are at an audible frequency.

This drawback is overcome in a known way with haptic-feedback devices in which an excitation at an ultrasonic, and therefore inaudible, frequency is used to generate a so-called squeeze-film effect. Such a device is in particular described in document EP1956466-A1. The propagation medium of the vibrations is then a thin, purely elastic or weakly viscoelastic plate. A plate is said to be "thin" when it possesses a thickness that is small compared to its two other dimensions and compared to the wavelength of the elastic waves in question.

As known, the plate may be monolithic or multi-layer and of rectangular shape. Electromechanical actuators are placed on the plate so as to excite an axial vibratory mode, i.e. one the vibrational nodes of which are aligned with respect to one another along a line parallel to one of the edges of the plate.

In a plate the thickness of which is no more than twice the wavelength of the vibration generated by the actuators, Lamb waves A0 (or generalized Lamb waves in the case of a multilayer plate that is asymmetric thicknesswise), which are commonly called flexural waves in the low-frequency approximation, are generated and reflect from the two boundaries parallel to the line of alignment of the actuators.

When the actuation frequency is correctly adjusted, a standing mode is excited that will act as an amplifier via a resonant effect. The large amplitudes of movement thus obtained at ultrasonic frequencies lead to the creation of a cushion of compressed air under the pulp of the finger of a user. Since the finger is repulsed by the surface, the coefficient of friction is decreased and a haptic-feedback effect may thus be obtained when the finger is in motion. This is the so-called squeeze-film effect.

Compared with the low-frequency vibro-tactile interfaces mentioned above, this second type of haptic-feedback interface has the advantage of being inaudible. However, in the current state of the art, this second type of haptic-feedback interface is limited to the creation of virtual textures that are felt by the user through an active touch, when a finger is moved over the surface. Thus, when the finger or the stylus is not moving, no haptic feedback is perceptible under the normal conditions of use.

OBJECTIVES OF THE INVENTION

The general objective of the present invention is to provide a haptic-feedback interface able to mitigate the aforementioned drawbacks of the aforementioned known interfaces.

One particular objective of the invention is to provide a haptic-feedback interface capable of producing, with the same hardware structure, a plurality of haptic effects that until now required different and incompatible structures.

Thus, the targeted single interface must be able to generate both artificial texture effects based on real-time control of the coefficient of friction and perceived during exploration of a surface (active touch), and low-frequency vibrational effects capable of exciting the mechanoreceptors located under the skin directly in their bandwidth (1 Hz to 1000 Hz).

In particular, the targeted interface must be able to generate a virtual-texture effect in response to a finger moving over a surface, or an effect that guides the finger along a path (this supposing the creation of a tangential driving force (for example allowing the outline of a letter or a shape to be felt)), or a click effect or notification effect in response to a passive touch without movement of the finger.

Another objective of the invention is to provide a haptic-feedback interface that generates no noise audible to the human ear.

Another objective of the invention is to provide a haptic-feedback interface the actuators of which are very compact and easy to integrate into the interface.

SUMMARY OF THE INVENTION

In principle, the invention consists in generating ultrasonic-frequency elastic waves that are such as to make particles of the surface of the interface move along weakly elliptical paths (i.e. paths that are as close to circular as possible), and that are capable of producing forces along a privileged axis in the plane of the interface. These forces are then modulated to produce the sought haptic effect, in response to an active touch or a passive touch by the user on the surface of the interface.

One subject of the invention is therefore a touch interface comprising, on the one hand, an interface surface able to generate a haptic-feedback effect in response to a touch of said surface by a user, and, on the other hand, at least one piezoelectric actuator configured to generate, on said interface surface, at least one ultrasonic-frequency wave able to impart, to the particles of this surface, an elliptical movement having a movement component tangential to said surface, which is denoted $u_t(t)$, and a movement component normal to said surface, which is denoted $u_n(t)$, characterized in that said ultrasonic-frequency wave is chosen so that the amplitude $U_t$ of the tangential component $u_t(t)$ and the amplitude $U_n$ of the normal component $u_n(t)$ are substantially equal.

According to one embodiment, the ultrasonic-frequency waves are chosen so as to generate an elliptical movement the tangential component $u_t(t)$ of which and the normal component $u_n(t)$ of which are such that the ratio $U_t/U_n$ of the amplitudes of the tangential movement component and of the normal movement component is comprised between 0.5 and 1.5.

According to one embodiment, the resulting ultrasonic waves are obtained by combining two standing waves that are of the same frequency but the drive signals of which are out of phase by 90°.

According to one embodiment, said standing waves are chosen so that the resulting ultrasonic wave is a traveling wave.

According to one embodiment, the resulting ultrasonic wave is obtained by combining two flexural waves.

According to one embodiment, the piezoelectric actuators are placed so as to generate a wave combining a flexural wave having a main component normal to the surface of the interface, and a compression-expansion wave having a main component tangential to the surface of the interface.

According to one embodiment, the surface of the interface takes the form of a rectangular plate the thickness of which is small with respect to its length and to its width, comprising, on one face of the plate, along one of its edges, a first set of piezoelectric actuators placed so as to generate a flexural wave in the plate, and comprising, on the thickness of said edge, a second set of piezoelectric actuators placed so as to generate a compression-expansion wave in the plate.

According to one embodiment, the surface of the interface takes the form of a rectangular plate the thickness of which is small with respect to its length and to its width, comprising, on one face of the plate, along one of its edges, a first set of piezoelectric actuators, and comprising, on the opposite face, along said edge, a second set of piezoelectric actuators, the two sets of actuators being driven so as to generate a flexural wave and a compression-expansion wave in the plate.

According to one embodiment, said plate comprises a transparent interface surface mechanically coupled to a display screen.

According to one embodiment, the touch interface further comprises a contact-force sensor that measures the pressing force of the finger of the user on the interface surface, and a means for driving the interface surface to vibrate when the pressing force exceeds a threshold of predetermined value.

The touch interface may also comprise a position sensor that records the position of the finger of the user when it is in contact with the surface of the interface, and a means for driving this surface to vibrate when the recorded contact position is a predefined position or in a predefined region of the interface surface.

Another subject of the invention is the use of the touch interface described above, said touch interface being configured so as to generate on contact with a finger or a stylus a click effect or notification effect in response to a passive touch of the interface surface.

By "passive touch" what is meant is a mode of interaction where the user places his finger on the surface without moving it in a direction tangential to the plane of the surface of the interface.

The haptic effect referred to as the "click" effect consists in producing a button-click sensation similar to the sensation felt by a user when a mechanical button is pressed. It is produced on the interface surface and is felt by the finger of the user when the latter presses the surface to activate a virtual button. The haptic feedback conveys a sensation comparable to the sensation experienced when a key or button on a tangible physical keyboard is pressed.

The haptic effect referred to as the "notification" effect corresponds to a vibro-tactile effect; however, unlike known vibro-tactile interfaces which vibrate the entire interface device, i.e. the device in its entirety including the casing, here the effect is localized to the interface surface by means of an ultrasonic-frequency wave, and is felt only when the finger of the user makes contact with the interface surface. The haptic notification allows the user to be informed that a task has ended, that a command has been received, that information that may be consulted is present, etc.

According to one mode of use, a 180° phase jump is applied to the two standing waves that are out of phase by 90 degrees, so as to reverse the direction of rotation of the particles set in elliptical motion, in order to create, under the pulp of the finger, a pulse sensation similar to a click effect.

According to one mode of use, the touch interface is configured so as to generate on contact with a finger or a stylus an effect that guides the finger or the stylus toward a predetermined region of the surface of the interface, in response to a passive touch of the surface of the interface.

According to one mode of use, the touch interface is configured so as to generate on contact with a finger or a stylus a virtual-texture effect via the squeeze-film effect, in response to an active touch of the interface surface.

By "active touch" what is meant is a mode of interaction where the user moves his finger over the interface surface in a direction tangential to the plane of the surface of the interface, with a movement similar to a "swipe" of the interface surface.

DETAILED DESCRIPTION

The invention will be described in more detail with reference to the figures, in which:

FIGS. 1A and 1B show a cross-sectional view of a touch interface according to the invention, and the elliptical movement of a particle of the surface of the interface, respectively;

FIG. 2 shows a perspective view from below and from above of one embodiment of a touch interface according to the invention;

FIG. 3 shows a perspective view from below of another embodiment of a touch interface according to the invention.

The basic principle of the invention is described with reference to FIGS. 1A and 1B. It consists in using particular elliptical movements of the particles of the surface of a touch interface in order to produce, at points of contact of this surface with the finger of a user (or a stylus), driving forces that exert themselves on these contact points, these driving forces including tangential forces along an axis located in the plane of the interface surface.

In the schematic of FIG. 1A, a vibrating plate 1, which for example consists of the surface glass of a touch screen, has been shown in cross section. The plate is vibrated by an ultrasonic-frequency wave that makes the plate 1 undulate by subjecting each elementary particle of the plate to an elliptical movement. The finger 5 touching the surface of the plate 1 is then driven in a direction, indicated by the arrow 6, corresponding to the direction of the tangential component of the elliptical movement of the particle 4 corresponding to the point of contact.

The path 8 of the elliptical movement of a particle 4 of the surface of the plate has been shown, enlarged, in FIG. 1B. It comprises, at any given time, a tangential component $u_t$ corresponding to a movement parallel to the plane of the plate, and a normal component $u_n$ corresponding to a movement perpendicular to the plane of the plate. The component $u_n$ of the driving force contributes to the squeeze-film effect, which is based on levitation of the finger above the surface of the touch interface. In the context of the invention, this effect of levitation of the finger corresponding to the normal component $u_n$ is therefore combined with the effect of lateral drag of the finger corresponding to the tangential component $u_t$ of the elliptical movement.

These tangential and normal components $u_t$, $u_n$ are given by the following equations ([Math 1], [Math 2]):

$$u_t = U_t \sin(\omega t) \qquad \text{[Math 1]}$$

$$u_n = U_n \cos(\omega t) \qquad \text{[Math 2]}$$

where $U_t$ and $U_n$ are the amplitudes corresponding to the length of the axes of the elliptical movement, $\omega$ is the angular frequency of the elliptical movement, and t denotes time.

Under these conditions, when a finger 5 touches a particle 4 of the surface subjected to this elliptical movement, this particle tends to communicate its speed to the pulp of the finger, generating a driving force that acts on the finger and that is oriented in the direction of rotation of the ellipse. In the case where this movement results from a traveling wave, it may be clockwise or counter-clockwise independently of the direction of propagation of the wave. In the case of a superposition of standing waves, it is the relative phase shift between the standing waves that creates locally an elliptical movement, which may be controlled via the reciprocal amplitude of the two waves.

If the tangential and normal amplitudes are such that $U_t/U_n \gg 1$, the particle 4 produces a reciprocating motion (high ellipticity) that is essentially tangential to the plane of the contact surface, but does not generate any repulsion in a direction normal to the surface, and therefore does not exert any drag on the finger relative to the surface. The average force generated over a period $2\pi/\omega$ is zero. No haptic effect is then perceptible in response to a touch, whether it be active or passive.

Similarly, if the amplitudes are such that $U_t/U_n \ll 1$, the particle 4 describes a movement essentially normal to the plane of the contact surface of the plate 1, but does not produce any movement along the axis tangential to the plane of the surface, and therefore zero tangential force is applied to the finger. Under these conditions, it is possible to obtain a virtual-texture effect, but not a click effect or a notification effect.

In respect of making it possible to obtain the various haptic-feedback effects targeted in response to an active touch or passive touch by the user (namely a squeeze-film effect, or a click effect, a notification effect, or a finger- or stylus-guiding effect), the invention has allowed it to be determined that there is an optimal ratio $U_t/U_n$ of the amplitudes $U_t$ and $U_n$ of the tangential and normal components of the ultrasonic-frequency wave producing an elliptical movement of the particles 4 of the surface.

This optimal ratio has been determined through psychophysical studies and is ideally equal to 1, which corresponds to a circular movement.

In practice, such as determined by a psychophysical study, very good results remain possible as long as the ellipticity ratio $U_t/U_n$ is comprised in an interval ranging from 0.5 to 1.5.

An ellipticity ratio $U_t/U_n$ that satisfies the following relationship ([Math 3]) is therefore preferably used:

$$0.5 \leq \frac{Ut}{Un} \leq 1.5 \qquad \text{[Math 3]}$$

Under these conditions, at any point of contact of the interface surface actuated by an elastic wave of ultrasonic frequency, tangential forces are obtained that are of sufficient amplitude to create clearly perceptible haptic sensations under the finger, including when the latter is immobile, i.e. in the context of what has been referred to as a passive touch.

In the context of application to haptic screens or to haptic surfaces in general, the thicknesses of the plates used are often small. They range from a few tenths of a millimeter for the OLED screens of a smartphone to a few millimeters for industrial control screens or thick plastics.

According to one aspect of the invention, in order to obtain a wave producing an elliptical movement of the particles 4 of the surface and satisfying the criterion of equation (3), one advantageous means consists in combining a flexural wave, having a transverse main component, with another type of vibration such as a compression-expansion wave, having a longitudinal main component.

A first embodiment associated with this approach has been schematically shown in FIG. 2. It may be obtained in various ways and in particular by combining two identical networks of piezoelectric actuators 3 placed on either side of the surface 1 to be actuated. The two identical networks of piezoelectric actuators 3 are placed on either side of the plate 1 to be actuated, along one edge thereof. The amplitude ratio of the two actuation signals allows the ratio between the flexural wave and the compression-expansion wave to be controlled. Control of the relative amplitudes of the two networks of actuators thus allows the respective weight of the flexural and compression-expansion waves to be adjusted so as to satisfy relationship (3).

Another embodiment for obtaining this same mode superposition has been shown in FIG. 3 and consists in replacing the actuators 3 on top (FIG. 2) with actuators 2 located on the edge face, that is to say on the thickness, of the plate 1 to be actuated. In this case, the actuators 3 located on the underside of the plate 1 serve only to generate flexural waves and the actuators 2 located on the edge face of the plate actuate only the compression-expansion waves.

Another embodiment (not shown) consists in generating two flexural waves, by means of two identical networks of piezoelectric actuators 3 this time placed on the same side of the surface 1 to be actuated, but on opposite edges.

Other embodiments that obtain a wave producing an elliptical movement of the particles 4 of the surface and satisfying the criterion of relationship (3) may be envisioned.

In each and every particular case, it becomes possible, simultaneously, with the same very simple hardware architecture, to create driving tangential forces (for example with a view to suggesting a path that the finger of a user placed on the surface might take in the context of a passive touch) and to control coefficient of friction with a view to obtaining a virtual-texture effect, in the context of an active touch whereby the finger is swept over the surface. The elliptical path of the points on the surface is obtained by shifting the phase of the flexural wave by 90° with respect to the compression-expansion wave.

In this configuration, it is possible to create haptic effects on a static press of a finger of the user (or stylus) at any point on the interface surface, even at a point that is distant from the position of the piezoelectric actuators, by suddenly inverting the direction of rotation of the vibration. This is achieved by creating a 180° jump in the phase of one of the two drive signals. A pulse sensation comparable for example to a click effect will then be felt under the pulp of the finger.

Multiplication of the reversals in the direction of rotation of the elliptical movement of the particles (which reversals are caused by a plurality of successive phase jumps) allows the pulp of the finger to be set vibrating, this vibration corresponding to perception of haptic feedback localized under the pulp of the finger. Such multiplication may also allow different click sensations to be produced.

Creation of an ultrasonic-frequency wave having a ratio $U_t/U_n$ close to 1 makes it possible to create, under the pulp of the finger, driving forces that make it possible either to suggest a path that a finger might take over a surface or a screen, or to make boundaries between two areas of a screen tangible, by creating forces opposed to the movement of the finger between these two regions.

Advantages of the Invention

The invention achieves the objectives set.

In particular, it makes it possible to obtain, with the same hardware structure, a plurality of haptic effects, and in particular artificial-texture effects in response to the exploration of a surface by an active touch, or indeed, in response to a passive touch (no movement of the finger by the user), effects that guide the finger along a path, or click or notification effects.

Furthermore, the haptic interface according to the invention is excited at an ultrasonic frequency and therefore does not generate noise audible to the human ear.

Lastly, the invention is easy to implement and to integrate into a haptic surface, by virtue of the small bulk permitted through the use of piezoelectric actuators.

The invention claimed is:

1. A touch interface comprising, on the one hand, an interface surface able to generate a haptic-feedback effect in response to a touch of said surface by a user, and, on the other hand, piezoelectric actuators configured to generate, at every point on said interface surface, ultrasonic vibration at the interface surface that imparts, to the particles of said surface, an elliptical movement having a movement component tangential to said surface, which is denoted $u_t(t)$, and which is of amplitude denoted $U_t$, and a movement component normal to said surface, which is denoted $u_n(t)$, and which is of amplitude denoted $U_n$, wherein said piezoelectric actuators are configured so that on said interface surface the amplitude $U_t$ of the tangential movement of the particles is substantially equal to the amplitude $U_n$ of the normal movement of the particles, and wherein said ultrasonic vibration is obtained at the interface surface by combining two standing waves of the interface surface having the same ultrasonic frequency.

2. The interface as claimed in claim 1, wherein the ultrasonic-frequency waves are chosen so as to generate an elliptical movement the tangential component $u_t(t)$ of which and the normal component $u_n(t)$ of which are such that the ratio $U_t/U_n$ of the amplitudes of the tangential movement component and of the normal movement component is between 0.5 and 1.5.

3. The touch interface as claimed in claim 1, wherein the drive signals of said two standing waves combined in the interface surface are out of phase by 90°.

4. The touch interface as claimed in claim 3, wherein said standing waves are chosen so that the resulting ultrasonic wave is a traveling wave.

5. The touch interface as claimed in claim 3, wherein said ultrasonic-frequency wave is a combination of two flexural waves.

6. The touch interface as claimed in claim 1, wherein the piezoelectric actuators are placed so as to generate a wave combining a flexural wave having a main component normal to the surface of the interface, and a compression-expansion wave having a main component tangential to the surface of the interface.

7. The touch interface as claimed in claim 6, wherein the surface of the interface takes the form of a rectangular plate the thickness of which is small with respect to its length and to its width, comprising, on one face of the plate, along one of its edges, a first set of piezoelectric actuators placed so as to generate a flexural wave in the plate, and comprising, on the thickness of said edge, a second set of piezoelectric actuators placed so as to generate a compression-expansion wave in the plate.

8. The touch interface as claimed in claim 7, wherein said plate comprises a transparent interface surface mechanically coupled to a display screen.

9. The touch interface as claimed in claim 6, wherein the surface of the interface takes the form of a rectangular plate the thickness of which is small with respect to its length and to its width, comprising, on one face of the plate, along one of its edges, a first set of piezoelectric actuators, and comprising, on the opposite face, along said edge, a second set of piezoelectric actuators, the two sets of actuators being driven so as to generate a flexural wave and a compression-expansion wave in the plate.

10. The touch interface as claimed in claim 1, comprising a contact-force sensor that measures the pressing force of the finger of the user on the interface surface, and a means for driving said surface to vibrate when the pressing force exceeds a threshold of predetermined value.

11. The touch interface as claimed in claim 1, comprising a position sensor that records the position of the finger of the user when it is in contact with the interface surface, and a means for driving said surface to vibrate when the recorded contact position is a predefined position or in a predefined region of said surface.

12. The use of the touch interface as claimed in claim 1, wherein the touch interface is configured to generate on contact with a finger or a stylus a click effect or notification effect in response to a passive touch of the interface surface.

13. The use as claimed in claim 12, wherein one or more 180° phase jumps are applied to the two standing waves that are out of phase by 90 degrees, so as to reverse the direction of rotation of the particles set in elliptical motion, in order to create, under the pulp of the finger, a pulse sensation similar to a haptic click effect or a haptic notification effect.

14. The use of the touch interface as claimed in claim 1, wherein the touch interface is configured so as to generate on contact with a finger or a stylus an effect that guides the finger or the stylus toward a predetermined region of the surface of the interface, in response to a passive touch of this surface.

15. The use of the touch interface as claimed in claim 1, wherein the touch interface is configured so as to generate on contact with a finger or a stylus a virtual-texture effect via the squeeze-film effect, in response to an active touch of the interface surface.

* * * * *